(12) United States Patent
Harwell

(10) Patent No.: US 10,148,634 B2
(45) Date of Patent: Dec. 4, 2018

(54) OPERATOR AUTHENTICATION FOR A WORK MACHINE

(71) Applicant: Deere & Company, Moline, IL (US)

(72) Inventor: Drew Harwell, Dubuque, IA (US)

(73) Assignee: Deere & Company, Moline, IL (US)

( * ) Notice: Subject to any disclaimer, the term of this patent is extended or adjusted under 35 U.S.C. 154(b) by 133 days.

(21) Appl. No.: 15/090,833

(22) Filed: Apr. 5, 2016

(65) Prior Publication Data
US 2017/0289121 A1  Oct. 5, 2017

(51) Int. Cl.
| | |
|---|---|
| H04L 29/06 | (2006.01) |
| H04W 12/06 | (2009.01) |
| A01B 79/00 | (2006.01) |
| E02F 9/00 | (2006.01) |
| H04W 12/08 | (2009.01) |
| H04W 84/18 | (2009.01) |

(52) U.S. Cl.
CPC ............ *H04L 63/08* (2013.01); *H04W 12/06* (2013.01); *A01B 79/00* (2013.01); *E02F 9/00* (2013.01); *H04L 63/06* (2013.01); *H04L 63/068* (2013.01); *H04L 63/10* (2013.01); *H04L 2463/061* (2013.01); *H04W 12/08* (2013.01); *H04W 84/18* (2013.01)

(58) Field of Classification Search
CPC .......... H04L 63/06; H04L 63/08; H04L 63/10
USPC ........................................................... 726/4
See application file for complete search history.

(56) References Cited

U.S. PATENT DOCUMENTS

| | | | | |
|---|---|---|---|---|
| 2013/0013617 A1* | 1/2013 | Cai | ................... | G06F 17/30336 707/746 |
| 2014/0068247 A1* | 3/2014 | Davis | ..................... | B60R 25/24 713/155 |

OTHER PUBLICATIONS

Time-based One-time Password Algorithm, Wikipedia, the free encyclopedia [online], Jun. 7, 2016 [retrieved Jun. 23, 2016]. Retrieved from the Internet <https://en.wikipedia.org/w/index.php?title=Time-based_One-time_Password_Algorithm&oldid=724156353>.

* cited by examiner

*Primary Examiner* — Anthony D Brown
(74) *Attorney, Agent, or Firm* — Joseph R. Kelly; Kelly, Holt & Christenson PLLC

(57) ABSTRACT

A mobile device receives a shared access key corresponding to a work machine. An access code is generated from the shared access key, and from a changing value (such as a time-sensitive value). The access code is transmitted to the work machine which, itself, calculates an access code based on the shared access key and based on the changing value. If the access code provided to the work machine and the access code generated by the work machine match one another, then the work machine unlocks corresponding functionality so that the operator can use the work machine.

20 Claims, 10 Drawing Sheets

OPERATOR AUTHENTICATION FOR A WORK MACHINE

FIELD OF THE DESCRIPTION

The present description relates to work machines. More specifically, the present description relates to operator authentication to use a work machine.

BACKGROUND

There are a wide variety of different types of work machines. Such work machines can include, for instance, agricultural machines, construction machines, machines used in forestry, turf management machines, etc.

Many such machines are used in scenarios where they may have multiple different users (or operators). For instance, a large agricultural organization may have multiple different operators who operate the same agricultural machine, during different shifts, or during different types of agricultural operations that are performed by that machine.

Some attempts have been made to control which operators can use the different machines. In some current scenarios, this is done by providing each operator with an access code that corresponds to a machine. When a given operator wishes to use that particular machine, the operator enters the access code into a control system on that machine, and the machine is unlocked so the operator is then able to utilize the functionality of the machine.

The discussion above is merely provided for general background information and is not intended to be used as an aid in determining the scope of the claimed subject matter.

SUMMARY

A mobile device receives a shared access key corresponding to a work machine. An access code is generated from the shared access key, and from a changing value (such as a time-sensitive value). The access code is transmitted to the work machine which, itself, calculates an access code based on the shared access key and based on the changing value. If the access code provided to the work machine and the access code generated by the work machine match one another, then the work machine unlocks corresponding functionality so that the operator can use the work machine.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
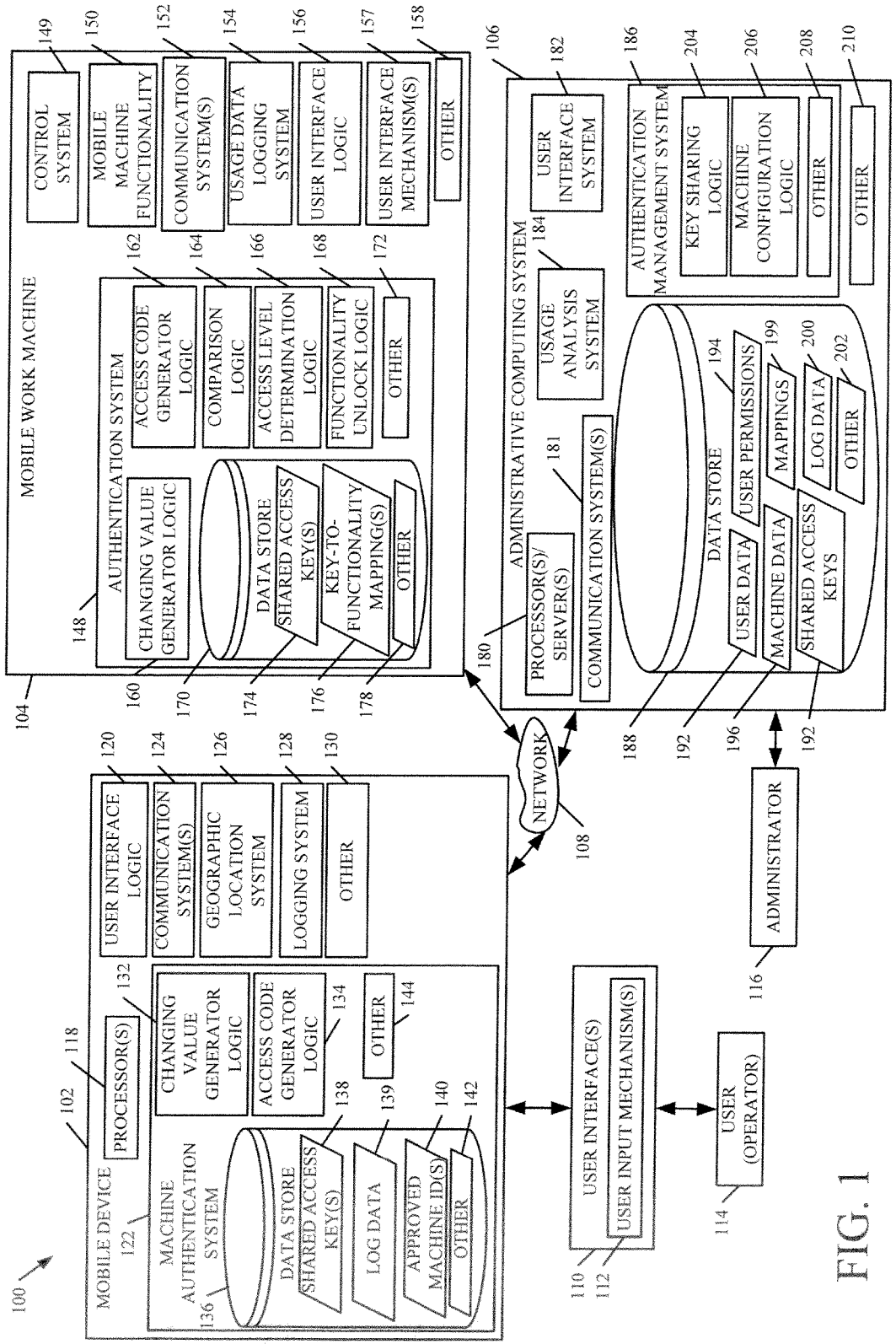
FIG. 1 is a block diagram of one example of a mobile machine authentication architecture.

FIG. 1 is a block diagram of one example of a mobile machine authentication architecture 100. Architecture 100 illustratively includes mobile device 102, mobile work machine 104 and administrative computing system 106. Device 102, machine 104 and system 106 can illustratively be connected directly to one another or they can be connected through network 108. Network 108 can be a wide area network, a local area network, a near field communication network, or another network.

FIG. 1 also shows that, in one example, mobile device 102 illustratively generates user interfaces 110, with user input mechanisms 112, for interaction by user 114. User 114 illustratively interacts with user input mechanisms 112 in order to control and manipulate device 102. In addition, FIG. 1 shows that administrative computing system 106 can be accessed by an administrative user (or administrator) 116. In one example, administrator 116 interacts with user input mechanisms on user interfaces in order to control and manipulate administrative computing system 106.

Before describing the operation of mobile machine authentication architecture 100 in more detail, a brief overview will first be described. In overall operation, administrator 116 illustratively programs administrative computing system 106 to grant various permissions to various operators 114. In doing so, administrator 116 can give the different operators 114 access to different shared access keys, where each access key corresponds to a different mobile work machine 104, or to a different set of functionality on a mobile work machine 104. At some point, an operator 114 downloads the shared access keys that they have been granted to that operator by administrator 116, onto their mobile device 102. This can be done by logging into a user's account (either stored in administrative computing system 106 or elsewhere) and downloading the shared access keys that operator 114 has been authorized with by administrator 116. Those shared access keys can then be used by operator 114, when operator 114 wishes to use functionality on a mobile work machine 104. This is described in greater detail below.

A brief description of some of the items in architecture 100 will now be described. Mobile device 102 can illustratively be a mobile phone, smart phone, tablet computer, or other mobile device. Some additional examples are described below in later figures. In the example shown in FIG. 1, mobile device 102 illustratively includes one or more processors 118, user interface logic 120, machine authentication system 122, one or more communication systems 124, geographic location system 126, logging system 128, and it can include a wide variety of other items 130.

User interface logic 120 illustratively includes logic that generates and transitions through various user interfaces 110. It can also include logic that detects user actuation of user input mechanisms 112, and other logic.

Machine authentication system 122 illustratively includes changing value generator logic 132, access code generator logic 134, and data store 136 (which illustratively includes one or more shared access keys 138, log data 139, one or more approved machine identifiers 140, and can include other items 142). Machine authentication system 122 can also, itself, include other items 144. When user, or operator, 114 wishes to access functionality on mobile work machine 104, the user provides a user input indicative of this. Changing value generator logic generates a changing value, such as a time-sensitive value that is derived from a clock (or other time keeping mechanism on mobile device 102 or elsewhere). Access code generator logic 134 then obtains a shared access key 138 corresponding to mobile work machine 104 and combines it with the changing value generated by changing value generator logic 132 in order to generate an access code. The access code is thus an ever changing value (such as a time-sensitive value). It is provided to mobile work machine 104 and is used in unlocking functionality of mobile work machine 104 for operator 114. This is described in greater detail below.

Communication systems 124 can include cellular communication systems, near field communication systems, wireless Internet communication systems, wired communication systems, or a wide variety of other systems. Systems 124 illustratively generate communications to, and receive communications from, mobile work machine 104 and administrative computing system 106.

Geographic location system 126 can be any of a wide variety of different types of geographic location systems. For instance, system 126 can be a global positioning receiver, or other geographic location system.

Logging system 128 illustratively logs relevant information 139 during the operation of mobile device 102. Some examples of this are also described in greater detail below.

In the example shown in FIG. 1, mobile work machine 104 illustratively includes authentication system 148, control system 149 that controls mobile machine functionality 150, one or more communication systems 152, usage data logging system 154, user interface logic 156, user interface mechanism(s) 157, and it can include a wide variety of other items 158. Authentication system 148 illustratively receives the access code generated by machine authentication system 122 in mobile device 102 and generates its own authentication code to determine whether operator 114 has been given access to functionality on mobile work machine 104. If so, it illustratively unlocks that functionality. Authentication system 148 thus illustratively includes changing value generator logic 160, access code generator logic 162, comparison logic 164, access level determination logic 166, functionality unlock logic 168, data store 170, and it can include a wide variety of other items 172. Data store 170, itself, illustratively includes one or more shared access keys 174, key-to-functionality mappings 176, and it can include other items 178.

Changing value generator logic 160 illustratively generates an ever changing value (such as a time-sensitive value) in the same way as changing value generator logic 132 on mobile device 102. Access code generator logic 162 also illustratively generates the access code in the same way as access code generator logic 134. Comparison logic 164 illustratively compares the access code received from mobile device 102 with the access code generated by access code generator logic 162 to determine whether they match. If so, this indicates that mobile device 102 has a shared access key 138 that matches one of the shared access keys 174 on mobile work machine 104. It may be that there are different levels of functionality or different machine configurations for which operator 114 is authorized. In that case, access level determination logic 166 determines the level of access to machine 104, that is to be granted to operator 114, based upon the particular shared access key that the operator has. Functionality unlock logic 168 then unlocks that level of functionality on mobile work machine 104 so that operator 114 can operate machine 104. This is also described in more detail below.

It is noted that the present discussion proceeds with respect to both mobile device 102 and mobile work machine 104 having changing value generator logic 132 and 160, respectively. However, this need not be the case. Instead, that logic can reside on either mobile device 102 or mobile work machine 104 so that when the changing value is generated, it is provided from mobile device 102 or mobile work machine 104 (wherever it was generated) to the other. In yet another example, the changing value generator logic resides elsewhere (other than on mobile device 102 or mobile work machine 104) and the changing value is provided to both mobile device 102 and mobile work machine 104 either through manual entry or automatically. All of these architectures are contemplated herein, and the architecture in which the changing value generator logic resides on both mobile device 102 and mobile work machine 104 is just one example.

Mobile machine functionality 150 will vary widely based upon the particular type of mobile work machine 104. Control system 149, which controls that functionality, may also vary. For instance, when machine 104 is a construction machine, such as a loader, then mobile machine functionality 150 may include functionality that is used to propel the work machine, to operate the lift and tilt functions of the loader, functionality to engage and manipulate various hydraulic, pneumatic, electric, or other actuators on machine 104, or a wide variety of other functionality. Control system 149 may thus receive operator inputs and sensor inputs or other inputs and control the actuators accordingly. It may be that user 114 only has access to a subset of mobile machine functionality 150. For instance, where operator 114 is an operator who is only in charge of driving mobile work machine 104 into a shop for maintenance, then operator 114 may only be given access to the propulsion and lift functionality 150 so that the operator can only lift and lower the bucket, and drive the loader forward and backward. However, if operator 114 is an operator who is to operate machine 104 using its full functionality, such as at a work site, then operator 114 may be authorized to use all of that functionality. In either case, functionality unlock logic 168 can access key-to-functionality mappings 176 to determine the level of functionality that is to be unlocked for this particular operator 114, and it can provide outputs to control system 149 to unlock mobile machine functionality 150, accordingly, and allow the operator to use it.

Communication systems 152 are illustratively one or more communication systems that allow machine 104 to communicate with mobile device 102 and administrative computing system 106. They can be similar to, or different from, communication systems 124 on mobile device 102.

Usage data logging system 154 illustratively logs usage data for machine 104. This data can take a wide variety of different forms, and some examples of this are described below in more detail.

User interface logic 156 also illustratively generates user interfaces that can be generated on user interface mechanisms 157. Logic 156 can also illustratively detect user interaction with mechanisms 157. The user interface mechanisms 157 can take a wide variety of different forms. They can include display screens, icons or actuatable display elements, levers, buttons, pedals, joysticks, steering wheels, touch sensitive screens, speech synthesis and speech recognition components, haptic feedback components or other audible, visual, haptic or mechanical or other components that can be used to generate user interfaces and/or receive user inputs.

Administrative computing system 106 illustratively includes one or more processors or servers 180, communication system(s) 181, user interface system 182, usage analysis system 184, authentication management system 186, data store 188, and it can include other items 190. Data store 188 can include user data 192, user permissions 194, machine data 196, shared access keys 198, mappings 199, log data 200, and it can include other records or information 202. Authentication management system 186 illustratively includes key sharing logic 204, machine configuration logic 206, and it can include other items 208. In operation, mobile machine 104 is programmed with its own access keys 174. Administrator 116 accesses key sharing logic in authentication management system 186 in order to obtain the access keys 174 from the various machines (collectively shown as keys 198) and share them with various operators 114. Administrator 116 can do this by granting user permissions 194 for operators 114 to access the shared access keys 198 to which they are assigned. Machine configuration logic 206 illustratively allows administrator 116 to obtain from the mobile work machines 104 their corresponding shared access keys 174 and to program machines 104 with any key-to-functionality mappings 176 that correspond to those keys.

User data 192 can identify the various users or operators 114 and can include user account information, such as user authentication information, usage information corresponding to various users, other user identifying information, etc. Machine data 196 illustratively identifies the various mobile work machines 104 that are being managed by administrator 116. Machine data 196 can also identify the various different machine configurations for each machine, a current machine configuration, different levels of functionality corresponding to each of the different machines, machine identifying information, and a wide variety of other information. Log data 200 can illustratively include a wide variety of different types of log data that can be stored for each machine 104, for each operator 114, or other data. Some examples of this are described in greater detail below.

Figure 2:
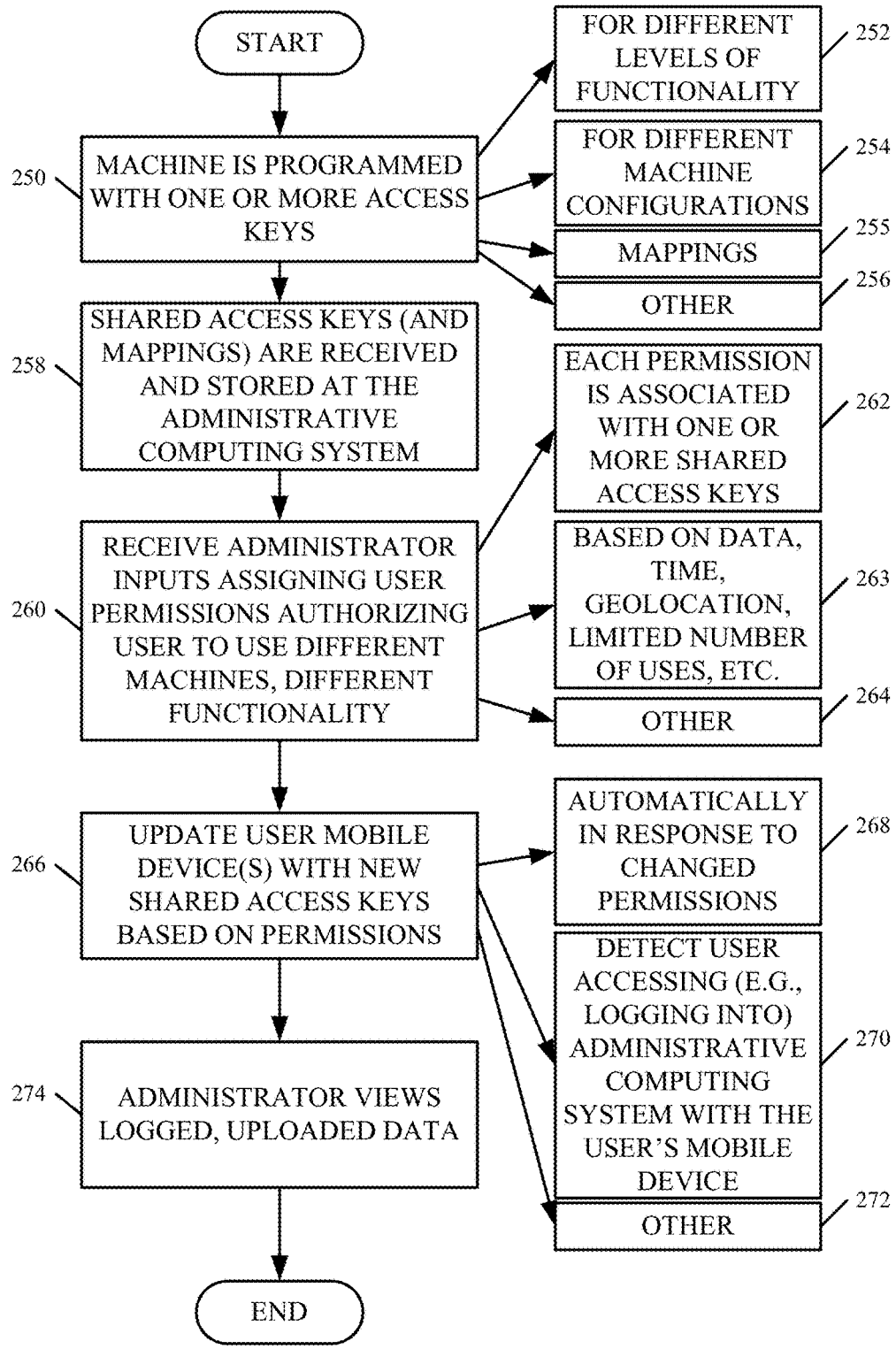
FIG. 2 is a flow diagram illustrating one example of the operation of the architecture shown in FIG. 1 in assigning shared access keys to one or more users.

A more detailed description of the operation of architecture 100 will now be provided. FIG. 2 is a flow diagram illustrating one example of the operation of architecture 100 in which administrator 116 configures architecture 100 so that operator 114 can access functionality on mobile work machine 104. It is first assumed that machine 104 is programmed with one or more access keys 174. This is indicated by block 250 in FIG. 2. As mentioned above, each machine 104 can have a single access key that is used to unlock all of the machine's functionality, or it can have a different shared access key that corresponds to a different level of functionality on that machine. This is indicated by block 252. The different shared access keys 174 can also correspond to different machine configurations, as indicated by block 254. For instance, where machine 104 is a combine harvester, it may be that operator 114 is authorized to use machine 104 when it is configured in a first way (such as with a specific header, etc.), but not authorized to use the machine when it is configured in a second way. This is but one example, and the same is true of other types of machines, such as other agricultural machines, construction machines, forestry machines, turf management machines, etc.

When there are different access keys corresponding to different machine configurations or functionality, then the machine 104 is also programmed with the key-to-functionality mappings 176 that map those keys to the machine functionality or configuration. This is indicated by block 255. It will be noted that the machine can be programmed in the factory, or after the machine leaves the factory, such as by a distributor, or other personnel.

Mobile work machine 104 can be programmed with the one or more access keys 174 in other ways as well. This is indicated by block 256.

The shared access keys (and possibly mappings) are also received and stored at the administrative computing system 106. It will be appreciated that the shared access keys and mappings will be received at administrative computing system 106, for each mobile work machine 104 that is to be administered by administrator 116. Receiving the shared access keys (and mappings) at administrative computing system 106 is indicated by block 258 in FIG. 2.

Administrator 116 then provides administrative inputs to key sharing logic 204 in order to assign user permissions 194 that authorize various users (or operators) 114 to use different machines, different functionality, etc. This is indicated by block 260 in FIG. 2. In one example, each permission 194 is associated with one or more shared access keys 198. This is indicated by block 262. Thus, when administrator 116 assigns operator 114 a permission, it gives operator 114 access to a corresponding shared access key. This shared access key, in turn, corresponds to (and authorizes that operator to use) a mobile work machine 104, or at least a set of functionality on a mobile work machine 104.

It will also be noted that administrator 116 can assign the permissions 194 so that usage of the shared access keys 198 is scoped by certain restrictions. By way of example, the permissions 194 may indicate that a particular operator 114 has access to a given shared access key 198 only during certain dates, during certain times of the day, at certain geographic locations, for a limited number of uses, etc. These are indicated by block 263. This may be the case, for instance, where an organization hires an operator 114 to operate machine 104 for a certain period of days. In that case, the permission 194 indicates that operator 114 has access to a given shared access key 198 only for those days. It may also be that operator 114 is only hired to operate the machine 104 at certain times of the day (e.g., during the second shift). In that case, the permission 194 indicates that operator 114 only has access to the corresponding shared access key 198 during that time of day. In yet another example, it may be that operator 114 is hired to operate machine 104 at a particular work site, in a particular field, etc. In that case, user permission 194 will illustratively indicate that operator 114 only has access to the corresponding shared access key 198 at that particular geographic location. It may also be that user 114 is only to use the machine a preset number of times. In that case, the user permission 194 will indicate that operator 114 only has access to the corresponding shared access key 198 that number of times. These are examples of various scopes and restrictions that can be placed on the shared access keys 198 using user permissions 194, and a wide variety of other ways of assigning user permissions can be used as well. This is indicated by block 264.

At some point, after administrator 196 has generated user permissions 194 that allow operators 114 to access different shared access keys 198, in computing system 106, the operator's mobile device 102 is then updated with the new, shared access keys 198, based upon the user permissions 194. This is indicated by block 266. This can be done in a wide variety of different ways. For instance, it can be done automatically in response to administrator 116 changing, adding, deleting or otherwise modifying a user permission 194. As an example, when key sharing logic 204 detects that administrator 116 has changed or otherwise modified a user permission 194, it can invoke communication system 181 to establish communication with mobile device 102 and automatically download the newly authorized shared access keys to mobile device 102, to delete shared access keys from mobile device 102 where permission has been withdrawn, or to otherwise modify the shared access keys on mobile device 102 or restrictions on them. By automatically it is meant that the action is performed without further user input, except perhaps, to initiate or authorize the process. Automatically updating mobile device 102 in response to changed permissions 194 is indicated by block 268 in FIG. 2.

In another example, mobile device 102 can be updated the next time operator 114 uses it to log into administrative computing system 106. This is indicated by block 270. By way of example, it may be that, as part of the login process, key sharing logic 204 is notified that a particular operator 114 is using his or her mobile device 102 to log into administrative computing system 106. Key sharing logic 104 then identifies whether the user permissions 194 for that particular operator 114 have been changed since the operator last logged in. If so, then the mobile device 102 is updated with any changes to the shared access keys or other information corresponding to that operator 114. Mobile device 102 can be updated in other ways as well. This is indicated by block 272.

When a mobile device 102 is updated, authentication management system 186 illustratively logs this information as log data 200. Thus, the administrator can view the logged data that has been updated on mobile device 102, and any other information that the mobile device 102 has uploaded to administrative computing system 106. Viewing the logged data is indicated by block 274 in FIG. 2.

Figure 3:
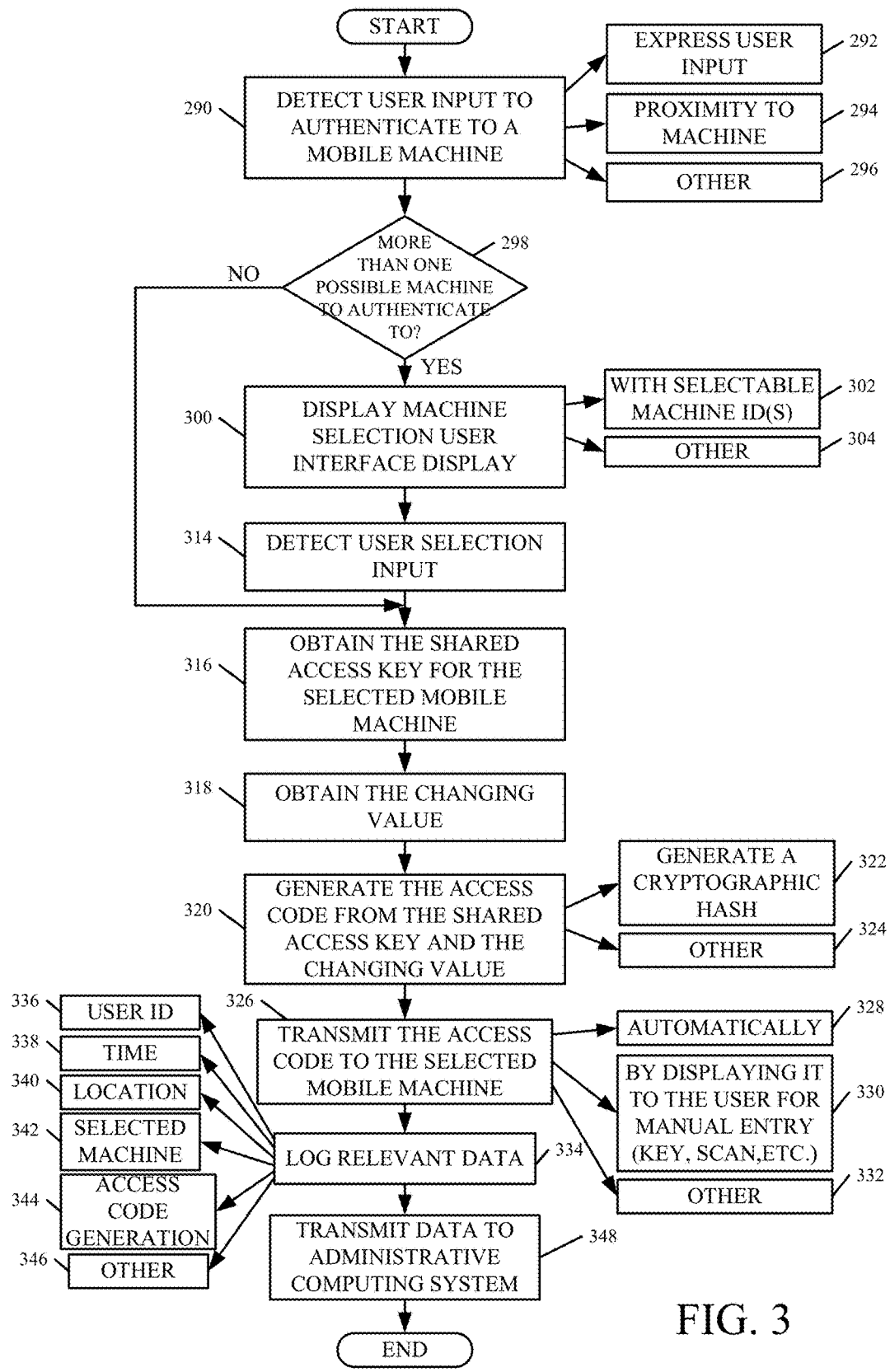
FIG. 3 is a flow diagram illustrating the operation of the architecture shown in FIG. 1 in which a mobile device generates an access code for transmission to a work machine.

FIG. 3 is a flow diagram illustrating one example of the operation of architecture 100 (shown in FIG. 1) in which operator 114 is using mobile device 102 to authenticate to a mobile work machine 104, so that operator 114 can operate machine 104. User interface logic 120 first detects a user input indicating that operator 114 wishes to authenticate to work machine 104. This is indicated by block 290 in FIG. 3. This may be by an express user input from operator 114 such as the operator actuating an icon user input mechanism 112 to authenticate to a machine. Detecting an express user input is indicated by block 292. It may also be detected in indirect ways as well. For instance, the geographic location system 126 on mobile device 102 (or another sensor) may indicate that operator 114 is in close proximity to a work machine 104 that the operator is authorized to operate. User interface logic 120 may detect this as an input to begin the authentication process in which operator 114 is authenticated to that machine. This is indicated by block 294. Detecting an input to authenticate to a mobile machine can be done in a wide variety of other ways as well, and this is indicated by block 296.

It may be that a given operator 114 is authorized on multiple different work machines 104. In that case, once the user input is detected indicating that operator 114 wishes to authenticate to a machine, user interface logic 120 illustratively generates a machine selection user interface display that allows the operator 114 to disambiguate among the various machines he or she is authorized to operate. This is indicated by blocks 298 and 300 in FIG. 3. The machine selection user interface display can include a list of selectable machine identifiers 302. It can be displayed in other ways as well, and this is indicated by block 304.

Figure 3A:
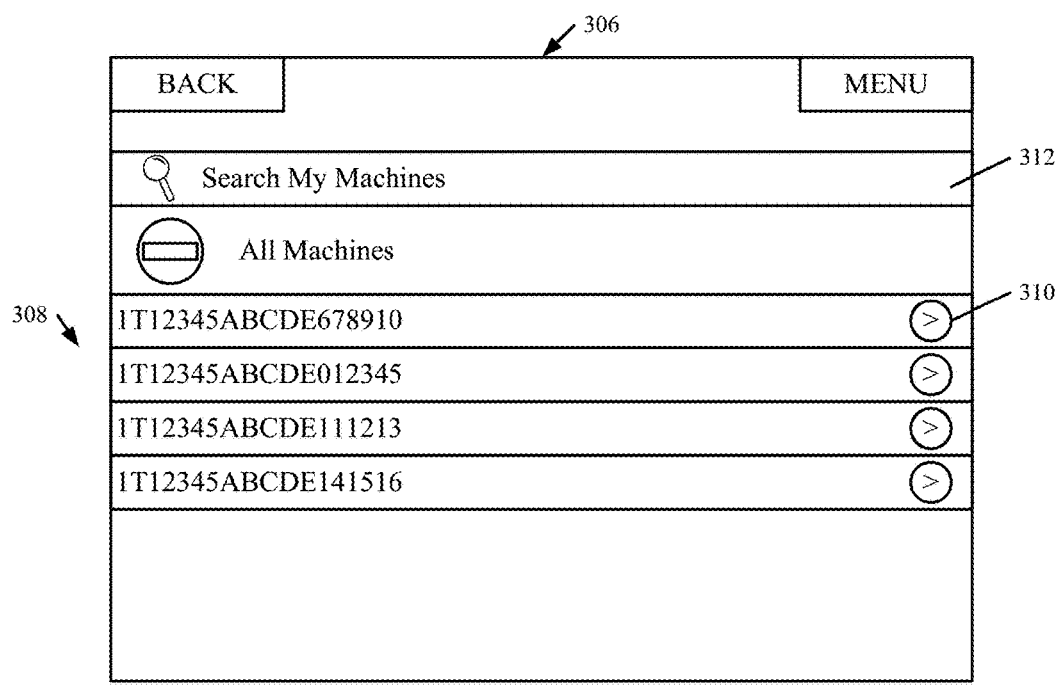
FIG. 3A is one example of a mobile device user interface display.

FIG. 3A illustrates one example of a user interface display 306 that can be generated by mobile device 102 in order to allow a user to select a particular machine for authentication. Display 306 illustratively includes a list of machine identifiers 308 where each item in the list corresponds to an approved machine identifier 140 (in FIG. 1) that identifies a machine that the operator 114 has permission to use. Each identifier 308 may also have a user actuatable input mechanism 310 which can be actuated to view additional identifying information corresponding to that machine. Each identifier 308 is also illustratively a user actuatable identifier that can be actuated by the user, to select a machine. For instance, the user may select a machine by tapping on, clicking on, or otherwise actuating the display element that displays that machine identifier.

Also, in the example shown in FIG. 3A, display 306 illustratively includes a search mechanism 312. Operator 114 can provide search criteria in search mechanism 312 in order to search for other machines that may not be automatically displayed in the list of machine display identifies 308.

User interface logic 120 detects a user selection input selecting one of the plurality of different machines. This is indicated by block 314 in the flow diagram of FIG. 3.

Once machine authentication system 122 has identified the particular machine for which operator 114 is attempting authentication, access code generator logic 134 obtains the shared access key 138 corresponding to that machine. Obtaining the shared access key for the selected machine is indicated by block 316. In addition, changing value generator logic 132 generates the changing value that is to be used in the authentication process. This is indicated by block 318. As one example, the changing value is either the time, or it is based on the time, or it is based on another ever changing value.

Access code generator logic 134 then generates an access code from the shared access key and the changing value. This is indicated by block 320. In one example, access code generator logic 134 is a cryptographic hash generator that generates a cryptographic hash based on the two values. This is indicated by block 322. The access code can be generated based on the two values in a wide variety of other ways as well, and this is indicated by block 324.

Access code generator logic 134 then uses one of communication systems 124 to transmit the access code to the selected mobile machine 104. This is indicated by block 326. This can be done automatically by logic 134, as soon as the access code is generated. This is indicated by block 328.

In another example, access code generator logic 134 displays the access code using user interface logic 120 for operator 114 for manual entry into machine 104. Operator 114 then enters the code through a suitable user interface mechanism 157 on mobile work machine 104. In yet another example, the access code is displayed on a display device of mobile device 102 so that it can be scanned by a code reader (e.g., one of the user interface mechanisms 157) on mobile work machine 104. Displaying the access code to the user for manual entry into mobile work machine 104 is indicated by block 330.

The access code can be transmitted from mobile device 102 to mobile work machine 104 in other ways as well. This is indicated by block 332.

Logging system 128 then logs any relevant data in data store 136, as log data 139, so that it can be transmitted to administrative computing system 106. Logging the relevant data is indicated by block 334 in FIG. 3. The relevant data can take a wide variety of different forms. For instance, it can include a user identifier that identifies operator 114. This is indicated by block 336. It can include the time that the authentication was requested as indicated by block 338. It can include the geographic location of mobile device 102 when the authentication was requested, as indicated by block 340. It can identify the selected machine for which authentication was requested, as indicated by block 342. It can be the actual access code that was generated, or an indication that an access code was generated at a particular time, using particular values, etc. This is indicated by block 344. The relevant data can take a wide variety of other forms as well, and this is indicated by block 346.

At some point, machine authentication system 122 illustratively uses one of the communication systems 124 to transmit the logged data 139 to the administrative computing system 106. This is indicated by block 348. There, it can be analyzed by usage analysis system 184, or any of a wide variety of other components, or it can simply be stored in data store 188, and it can be later accessed by administrator 116.

It will be noted that, in an example in which restrictions are placed on the operator's use of an access key, those restrictions may be enforced at any point in the process. For instance, when the operator selects a machine for authentication, machine authentication system 122 can then check to see whether any relevant restrictions are met. As an example, if operator 114 is restricted to using an access key in a certain geographic region, during a certain time period, etc., then system 122 checks to ensure that the operator is in that geographic location, or it is during the specified time period, etc. This can be done using sensor inputs from sensors on the mobile device 102 or otherwise. If not, then an error message (or other message) can be generated and the attempted authentication can be logged as well. The restrictions can be enforced at other times and in other ways as well.

Figure 4:
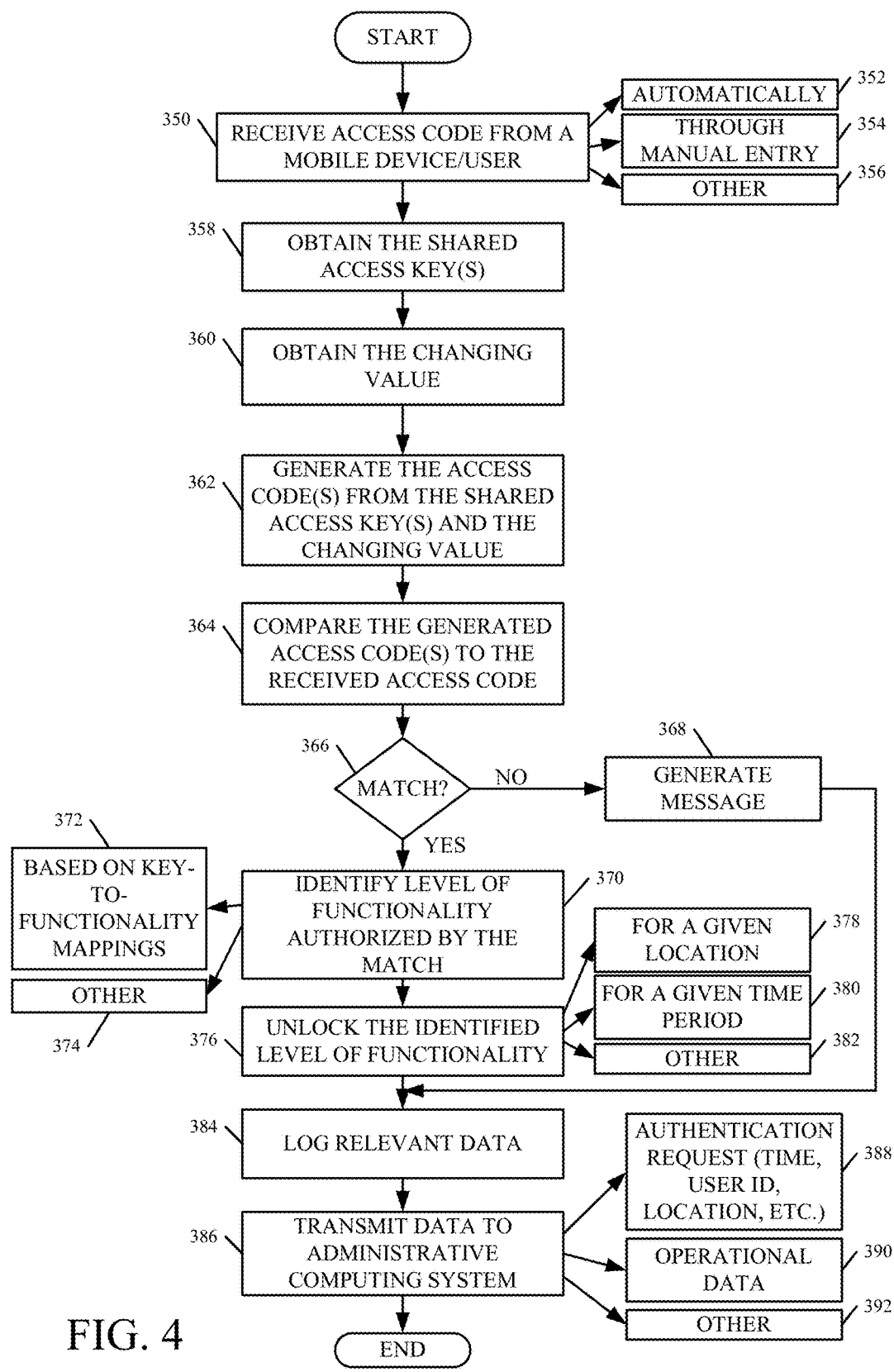
FIG. 4 is a flow diagram illustrating one example of the operation of the architecture shown in FIG. 1 in which a work machine receives an access code from a mobile device, compares it to an access code that it generates itself, and selectively unlocks corresponding functionality for an operator.

FIG. 4 is a flow diagram illustrating one example of the operation of architecture 100 during which mobile work machine 104 receives and processes an access code from mobile device 102 to authenticate operator 114 to use mobile work machine 104. Mobile work machine 104 first receives an access code from mobile device 102 or operator 114. This is indicated by block 350 in FIG. 4. Again, it can be received automatically as indicated by block 352, it can be received through manual entry as indicated by block 354, or it can be received in other ways as indicated by block 356.

Access code generation logic 162 then obtains the shared access key 174 that was previously programmed into machine 104. Where there are multiple shared access keys (such as where access keys correspond to different levels of functionality in mobile work machine 104) all of them can be obtained. Obtaining the one or more shared access keys is indicated by block 358 in FIG. 4.

Changing value generator logic 160 then generates the changing value in the same way as changing value generator logic 132 on mobile device 102. Obtaining the changing value is indicated by block 360. Again, this can be a time-based value or it can be another ever changing value as well.

Access code generator logic 162 then generates one or more access codes from the one or more shared access keys and from the changing value. This is indicated by block 362. Where the machine only has a single shared access key 174, then only a single access code is generated. However, where it has multiple shared access keys, then multiple access codes can be generated.

Comparison logic 164 then compares the one or more access codes that were generated by access code generator logic 162 against the one received from the mobile device 102. This is indicated by block 364. If none of the access codes generated on machine 104 not match the access code received by mobile device 102, then an appropriate message is generated and displayed or otherwise transmitted to operator 114 indicating that the authentication was not successful. This can be done using user interface mechanisms 157 on mobile work machine 104 or using user interfaces 110 generated by mobile device 102, or in other ways. This is indicated by blocks 366 and 368 in FIG. 4.

However, if, at block 366, the received access code matches at least one of the access codes generated on mobile work machine 104, that indicates that this particular operator 114 is authorized to use at least some functionality on mobile work machine 104. Thus, access level determination logic 166 identifies the level of functionality authorized by the match. This is indicated by block 370. By way of example, if mobile work machine 104 has five different levels of functionality, then each may be associated with its own shared access key. The particular access code that was matched will correspond to one of those shared access keys. Access level determination logic 166 can identify that shared access key and examine the access key-to-functionality mappings 176 to identify the particular level of functionality that will be unlocked for this particular operator. Accessing the mappings is indicated by block 372. Identifying the level of functionality authorized by the matched access code can be done in other ways as well, and this is indicated by block 374.

Functionality unlock logic 168 then unlocks the identified level of functionality (in mobile machine functionality 150) based upon the authorized level of functionality. This is indicated by block 376. Again, the functionality may be unlocked in a scoped or restricted manner. For instance, the functionality may be unlocked only for a given geographic location. If mobile work machine 104 travels outside of that given geographic location (as indicated by a geographic position sensor or other sensor on mobile work machine 104, or by geographic location system 126 on mobile device 102) then the functionality may again be locked. Unlocking the functionality for a given location is indicated by block 378.

The functionality may also be unlocked for a given time period, for a given duration, or otherwise based on time. This is indicated by block 380. The functionality can be unlocked in other ways as well, and this indicated by block 382.

The functionality can be unlocked with a wide variety of different mechanisms, and that will depend on the way the particular functionality is implemented. For instance, if it is hydraulic functionality, then unlock logic 168 provider outputs to control system 149 to control the hydraulic valves that implement that functionality so that they can be manipulated by the user to perform the functionality. If the functionality is electric or pneumatic, then the electric or pneumatic controllers can be unlocked as well. These are examples only.

Usage data logging system 154 then logs relevant data in data store 170. This is indicated by block 384. The relevant data can take a wide variety of different forms. For instance, it can include machine operating conditions or operating parameters that are recorded while operator 114 is operating the machine. It can include the time of day, the location of the machine, the user's identity, the machine's identity, the various functionality that was used, how it was used, various sensor readings that are taken during operation, or a wide variety of other relevant data.

At some point, the usage data is transmitted to administrative computing system 106. This can be done by usage data logging system 154 using one of communication systems 152, or in other ways. Transmitting the data to the administrative computing system is indicated by block 386 in FIG. 4. As discussed above, the data can be data corresponding to the authentication request (such as the time of day, the user ID, the location of the machine where the request was made, etc.). This is indicated by block 388. It can also include a wide variety of different types of operational or usage data, as discussed above. This is indicated by block 390. It can include other data as well. This is indicated by block 392.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information on map 107 can be output to the cloud.

Figure 5:
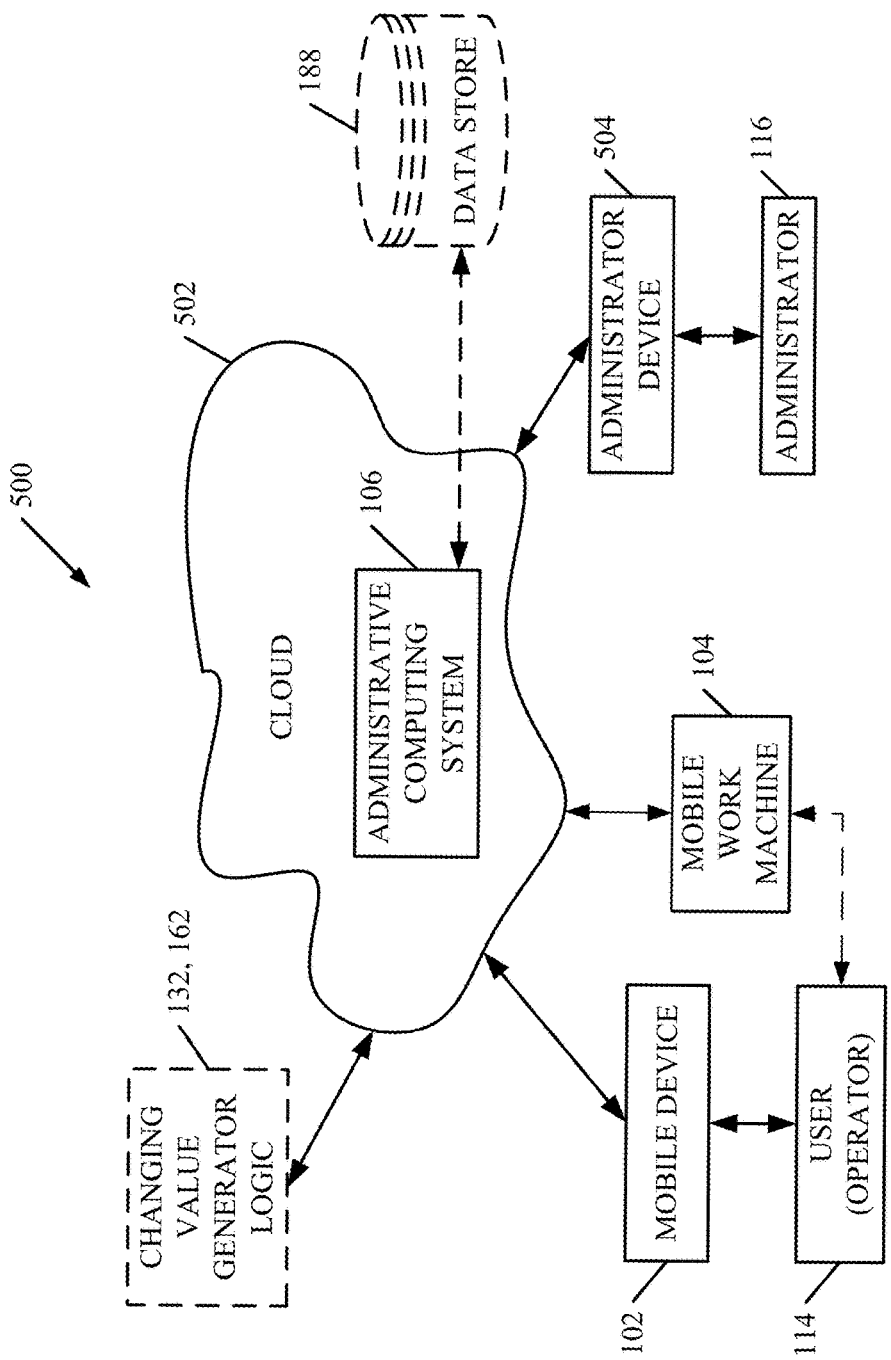
FIG. 5 shows one example of the architecture illustrated in FIG. 1, deployed in a cloud computing architecture.

FIG. 5 is a block diagram of architecture 100, shown in FIG. 1, except that it is disposed in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components or logic shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIG. 1 and they are similarly numbered. FIG. 5 specifically shows that administrative computing system 106, can be located at a remote server location 502. Therefore, administrator 116 accesses that system through remote server location 502 using administrator 504.

FIG. 5 also depicts another example of a remote server architecture. FIG. 5 shows that it is also contemplated that some elements of FIG. 1 are disposed at remote server location 502 while others are not. By way of example, data store 188 or changing value generator logic 132, 162 be disposed at a location separate from location 502, and accessed through the remote server at location 502. Regardless of where they are located, they can be accessed directly by mobile device 102 or work machine 104, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the mobile device 102 or machine 104 comes close to the fuel truck for fueling, the system automatically collects (or downloads) the information from the mobile device 102 or machine 104 (or to those devices) using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the mobile device 102 or machine 104 until it enters a covered location. The mobile device 102 or machine 104, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
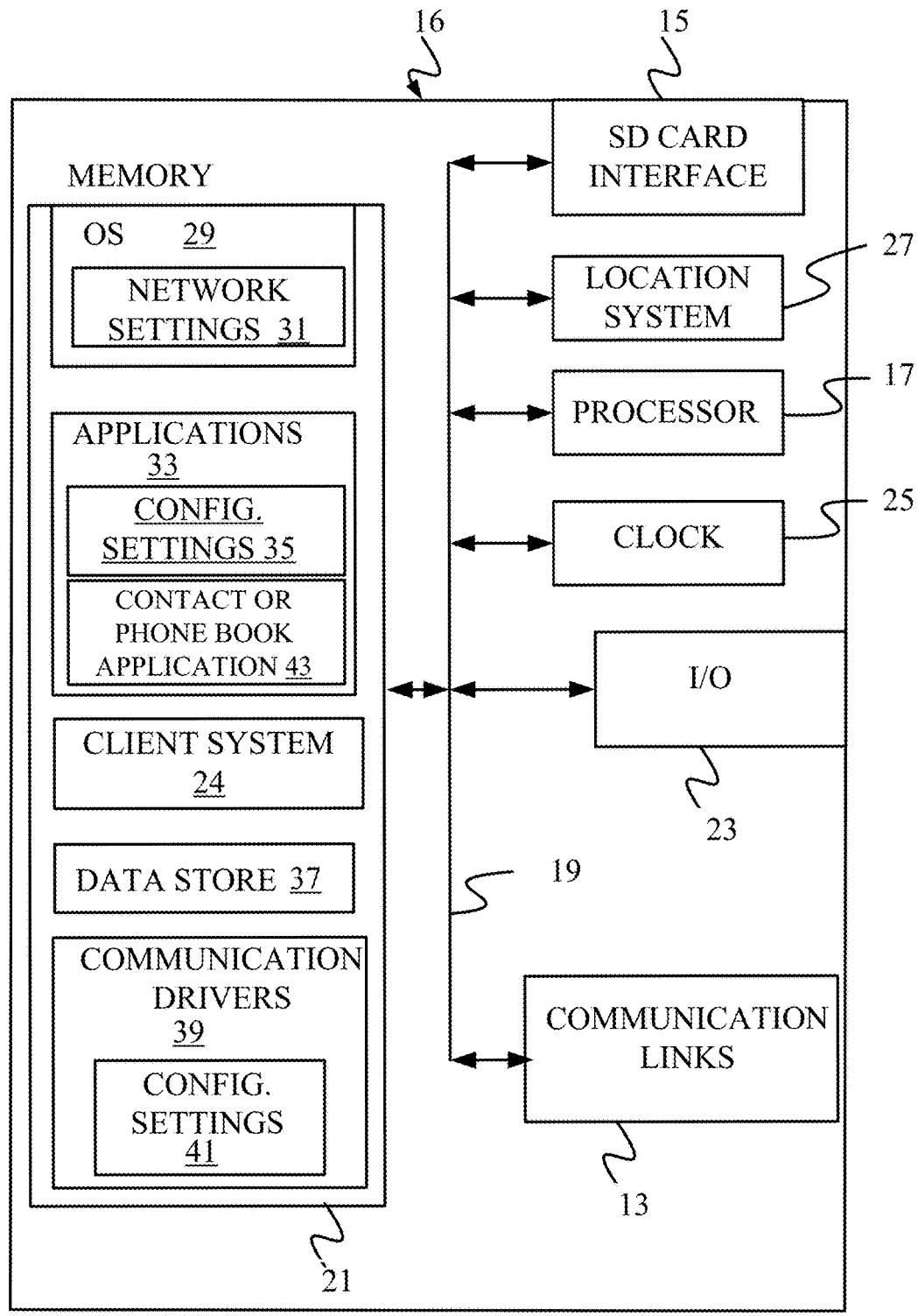
FIGS. 6-8 show various examples of mobile devices that can be used in the architectures shown in the previous figures.
Figure 7:
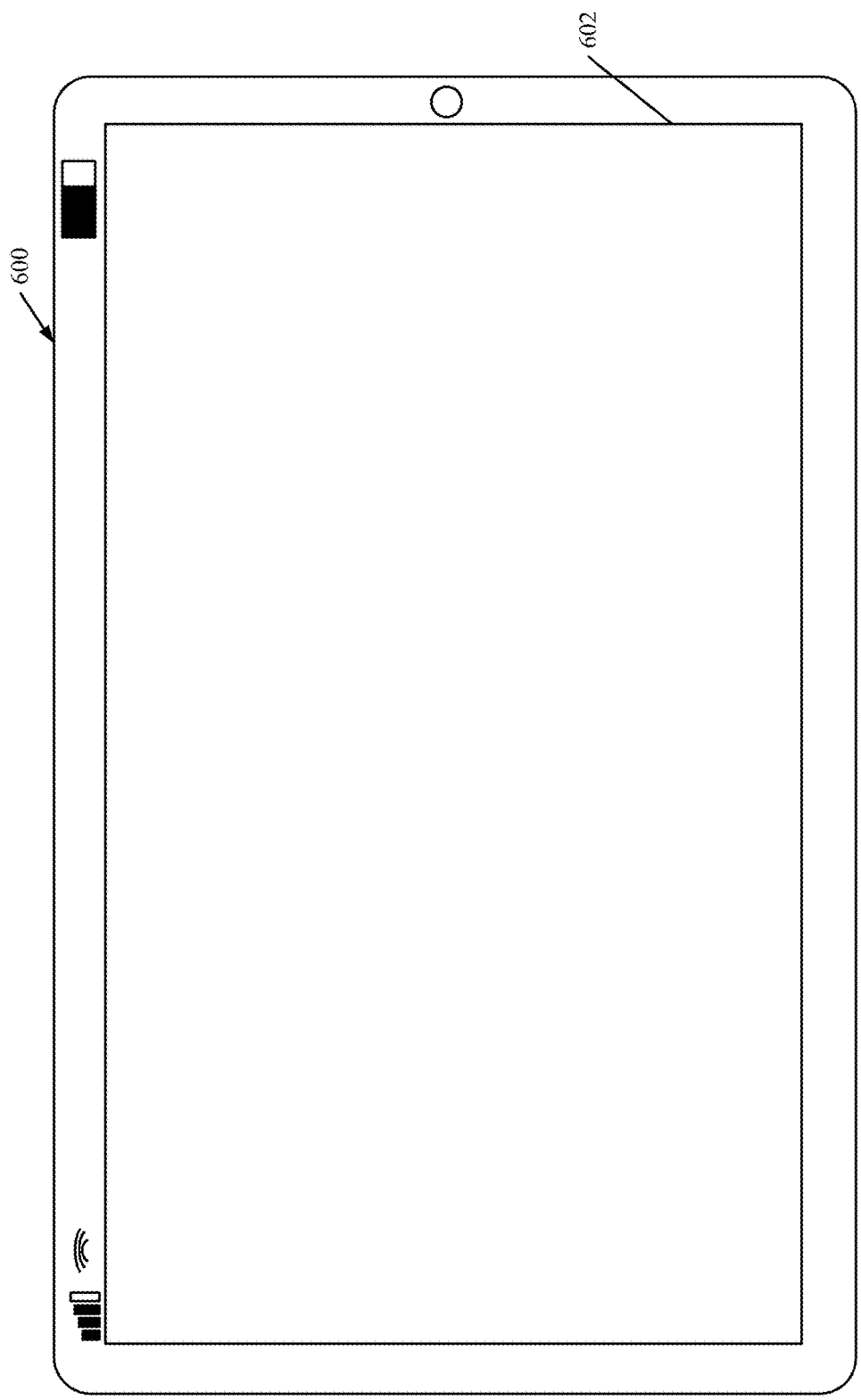
Figure 8:
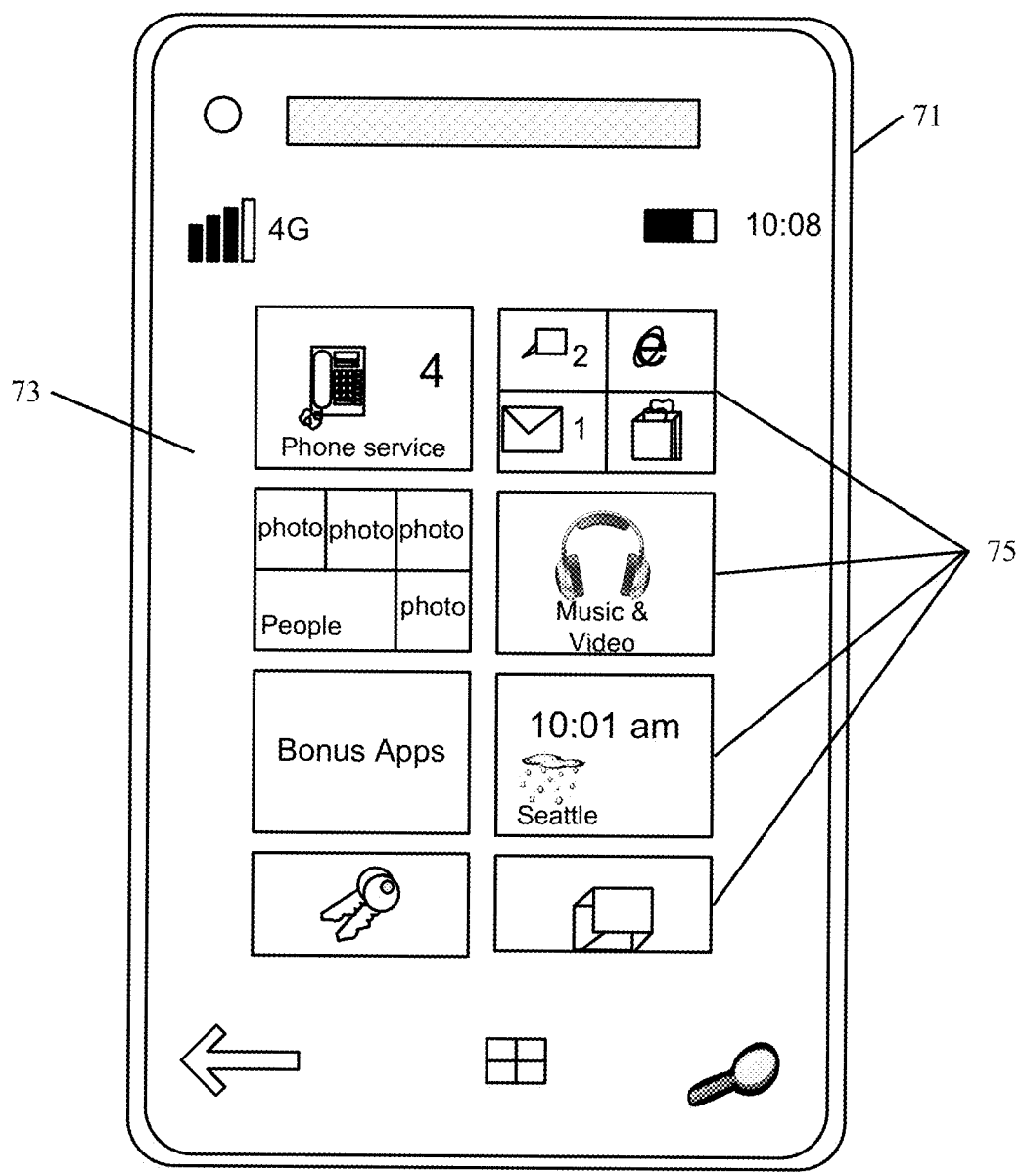
Figure 9:
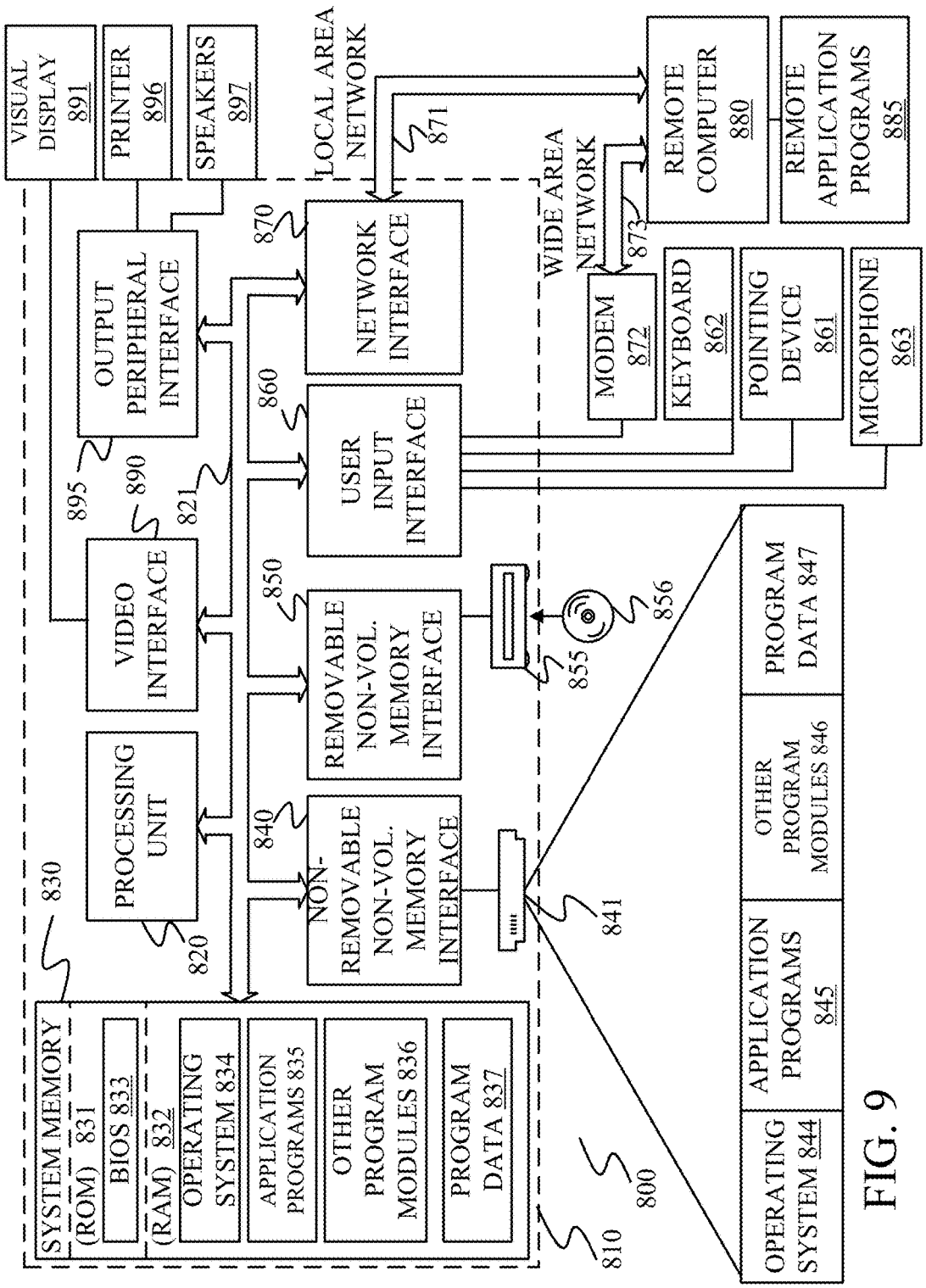
FIG. 9 is a block diagram of one example of a computing environment that can be used in the architectures shown in the previous figures.

FIG. 6 is a simplified block diagram of one illustrative example of a handheld or mobile computing device that can be used as a user's or client's hand held device 16, in which the present system (or parts of it) can be deployed. Device 16 is an example of a device that can be used as device 102 in FIGS. 1 and 5. Also, for instance, a mobile device can be deployed in the operator compartment of machine 104 for use in generating, processing, inputting, or displaying data. FIGS. 7-9 are examples of handheld or mobile devices.

FIG. 6 provides a general block diagram of the components of a client device 16 that can run some components shown in FIG. 1, that interacts with them, or both. In the device 16, a communications link 13 is provided that allows the handheld device to communicate with other computing devices and under some examples provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors or servers from FIG. 1) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one example in which device 16 is a tablet computer 600. In FIG. 7, computer 600 is shown with user interface display screen 602. Screen 602 can be a touch screen or a pen-enabled interface that receives inputs from a user's finger, a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the mobile device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one example of a computing environment in which elements of FIG. 1, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processor or servers from previous Figures), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, nonvolatile magnetic disk 852, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is a mobile work machine, comprising:

functionality components that perform machine functionality;

a control system that controls the functionality components;

an authentication system that receives a first access code that is generated based on a first access key stored on a mobile device and a time varying value and generates a second access code based on a second access key stored on the mobile work machine and the time varying value and compares the first and second access codes and generates an access code comparison signal indicative of the comparison; and functionality unlock logic that selectively controls the control system to unlock the functionality components based on the access code comparison signal.

Example 2 is the mobile work machine of any or all previous examples wherein the authentication system comprises:

changing value generator logic that generates the time varying value based on a time at which the time varying value is generated.

Example 3 is the mobile work machine of any or all previous examples wherein the authentication system comprises:

a data store that stores the second access key.

Example 4 is the mobile work machine of any or all previous examples wherein the authentication system comprises:

access code generator logic that obtains the second access key and the time varying value and generates the second access code based on the second access key and the time varying value.

Example 5 is the mobile work machine of any or all previous examples wherein the access code generator logic comprises:

a cryptographic hash component that generates the second access code as a cryptographic hash of the second access key and the time varying value.

Example 6 is the mobile work machine of any or all previous examples wherein the data store stores a plurality of different access keys and wherein the functionality components perform different sets of machine functionality, each of the plurality of different access keys corresponding to a different set of machine functionality, and wherein the access code generator logic generates a separate access code, based on the time varying value, corresponding to each of the plurality of different access keys.

Example 7 is the mobile work machine of any or all previous examples wherein the authentication system comprises:

comparison logic that compares each separate access code to the first access code to identify a matching access code, of the separate access codes, that matches the first access code.

Example 8 is the mobile work machine of any or all previous examples wherein the comparison logic identifies a matched access key as a given one of the plurality of different access keys that corresponds to the matching access code, and wherein the authentication system comprises:

access level determination logic that identifies the set of machine functionality corresponding to the matched access key, the functionality unlock logic controlling the control system to unlock the identified set of machine functionality.

Example 9 is the mobile work machine of any or all previous examples wherein the access level determination logic identifies a scope of authentication indicative of restrictions on the unlocked set of machine functionality, the functionality unlock logic unlocking the identified set of machine functionality, restricted according to the restrictions.

Example 10 is the mobile work machine of any or all previous examples wherein the scope of authentication comprises at least one of a temporal restriction on the unlocked machine functionality, a geographic restriction on the unlocked machine functionality, or a number of uses restriction on the unlocked machine functionality.

Example 11 is a mobile device, comprising:

a storage component;

a communication component that loads a first access key, corresponding to a given mobile work machine, into the storage component from a remote computing system;

changing value generator logic that generates a time-based value;

access code generator logic that detects an input indicative of a request to generate a first access code, and generates the first access code based on the time-based value and the first access key; and an interface mechanism that outputs an authentication request, comprising the first access code, for entry into the given mobile work machine to unlock machine functionality on the given mobile work machine.

Example 12 is the mobile device of any or all previous examples wherein the interface mechanism comprises:

a display device that displays the first access code for manual entry into the given mobile work machine.

Example 13 is the mobile device of any or all previous examples wherein the interface mechanism automatically transmits the first access code to the given mobile work machine.

Example 14 is the mobile device of any or all previous examples and further comprising:

a logging system that logs data indicative of the authentication request, wherein the communication component transmits the logged data to the remote computing system.

Example 15 is the mobile device of any or all previous examples wherein the communication component loads a plurality of different access keys, each corresponding to a different mobile work machine, into the storage component, from the remote computing system, and further comprising:

user interface logic that controls the display device to display a user actuatable machine identifying display element corresponding to each of the different mobile work machines and to detect user actuation of a given one of the user actuatable machine identifying display elements to identify one of the different mobile work machines.

Example 16 is the mobile device of any or all previous examples wherein the access code generation logic generates the first access code based on the time-based value and one of the plurality of different access keys that corresponds to the identified one of the mobile work machines.

Example 17 is an administrative computing system, comprising:

a communication system that obtains a plurality of access keys, each access key corresponding to, and being stored on, and facilitating access to machine functionality of, a different mobile work machine;

key sharing logic that detects administrative key sharing inputs and generates permissions, each permission granting an operator access to a corresponding access key, identified in the corresponding permission; and a communication system that updates a mobile device corresponding to the operator with the access key identified in the corresponding permission.

Example 18 is the administrative computing system of any or all previous examples wherein the communication system obtains a set of access keys for each of the different mobile work machines, each set of access keys having a different access key unlocking a different set of machine functionality on the corresponding mobile work machine, the key sharing logic generating the permissions to map the operator to a set of machine functionality for which the operator is authorized on a mobile work machine using the set of access keys.

Example 19 is the administrative computing system of any or all previous examples wherein the communication system detects a change to a permission and, in response, automatically updates the mobile device corresponding to the operator.

Example 20 is the administrative computing system of any or all previous examples wherein the communication component detects the operator logging in to a user account administered by the administrative computing system and, in response, updates the mobile device with the access key identified in the permission.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A mobile work machine, comprising:
functionality components that perform machine functionality;
a control system that controls the functionality components;
an authentication system that receives a first access code that is generated based on a first access key stored on a mobile device and a time varying value and generates a second access code based on a second access key stored on the mobile work machine and the time varying value and compares the first and second access codes and generates an access code comparison signal indicative of the comparison;
access level determination logic that accesses a mapping that maps each of a plurality of different access keys to a different set of machine functionality, and that identifies a particular set of machine functionality corresponding to the second access key, based on the mapping; and
functionality unlock logic that selectively controls the control system to unlock the particular set of machine functionality for implementation with the functionality components, based on the access code comparison signal.

2. The mobile work machine of claim 1 wherein the authentication system comprises:

changing value generator logic that generates the time varying value based on a time at which the time varying value is generated.

3. The mobile work machine of claim 1 wherein the authentication system comprises:
a data store that stores the second access key.

4. The mobile work machine of claim 3 wherein the authentication system comprises:
access code generator logic that obtains the second access key and the time varying value and generates the second access code based on the second access key and the time varying value.

5. The mobile work machine of claim 4 wherein the access code generator logic comprises:
a cryptographic hash component that generates the second access code as a cryptographic hash of the second access key and the time varying value.

6. The mobile work machine of claim 4 wherein the data store stores the plurality of different access keys and wherein the functionality components perform different sets of machine functionality, and wherein the access code generator logic generates a separate access code, based on the time varying value, corresponding to each of the plurality of different access keys.

7. The mobile work machine of claim 6 wherein the authentication system comprises:
comparison logic that compares each separate access code to the first access code to identify a matching access code, of the separate access codes, that matches the first access code.

8. The mobile work machine of claim 7 wherein the comparison logic identifies a matched access key as a given one of the plurality of different access keys that corresponds to the matching access code, and wherein the authentication system comprises:
access level determination logic that identifies the particular set of machine functionality corresponding to the matched access key, the functionality unlock logic controlling the control system to generate control signals that enable operator control of the mobile work machine according to the particular set of machine functionality.

9. The mobile work machine of claim 8 wherein the access level determination logic identifies a scope of authentication indicative of restrictions on the unlocked set of machine functionality, the functionality unlock logic unlocking the particular set of machine functionality, restricted according to the restrictions.

10. The mobile work machine of claim 9 wherein the scope of authentication comprises at least one of a temporal restriction on the unlocked machine functionality, a geographic restriction on the unlocked machine functionality, or a number of uses restriction on the unlocked machine functionality.

11. A mobile device, comprising:
a storage component;
a communication component that loads a first access key, corresponding to a given mobile work machine, into the storage component from a remote computing system, wherein the first access key is identified by the communication component based on a mapping that maps each of a plurality of different access keys to a different level of machine functionality of a different mobile work machine;
access code generator logic that detects an input indicative of a request to generate a first access code, and generates the first access code based on a time-based value and the first access key; and
an interface mechanism that outputs an authentication request, comprising the first access code, for entry into the given mobile work machine to unlock a particular level of machine functionality, on the given mobile work machine, mapped to the first access key in the mapping.

12. The mobile device of claim 11 and further comprising:
changing value generator logic that generates the time-based value.

13. The mobile device of claim 11 wherein the interface mechanism comprises:
a display device that displays the first access code for manual entry into the given mobile work machine.

14. The mobile device of claim 11 wherein the interface mechanism automatically transmits the first access code to the given mobile work machine.

15. The mobile device of claim 13 wherein the communication component loads the plurality of different access keys, each corresponding to a different mobile work machine, into the storage component, from the remote computing system, and further comprising:
user interface logic that controls the display device to display a user actuatable machine identifying display element corresponding to each of the different mobile work machines and to detect user actuation of a given one of the user actuatable machine identifying display elements to identify one of the different mobile work machines.

16. The mobile device of claim 15 wherein the access code generation logic generates the first access code based on the time-based value and one of the plurality of different access keys that corresponds to the identified one of the mobile work machines.

17. An administrative computing system, comprising:
a communication system that obtains a plurality of access keys, each access key corresponding to one or more different sets of machine functionality and being stored on a different mobile work machine;
key sharing logic that detects administrative key sharing inputs and generates permissions, each permission granting an operator access to a corresponding access key, identified in the corresponding permission; and
wherein the communication system updates a mobile device corresponding to the operator with the access key, identified in the corresponding permission, to facilitate implementation of a particular set of machine functionality, corresponding to the identified access key, with a control system of a given mobile work machine.

18. The administrative computing system of claim 17 wherein the communication system obtains a set of access keys for each of the different mobile work machines, each set of access keys having a different access key unlocking one or more of the different sets of machine functionality on the corresponding mobile work machine, the key sharing logic generating the permissions to map the operator to the particular set of machine functionality for which the operator is authorized on a mobile work machine using the set of access keys.

19. The administrative computing system of claim 17 wherein the communication system detects a change to a permission and, in response, automatically updates the mobile device corresponding to the operator.

20. The administrative computing system of claim 17 wherein the communication component detects the operator logging in to a user account administered by the administrative computing system and, in response, updates the mobile device with the access key identified in the permission.

* * * * *